United States Patent [19]

Gens

[11] 4,304,530
[45] Dec. 8, 1981

[54] ARRANGEMENT FOR ATTACHING A TANK FITTING TO A FUEL TANK

[75] Inventor: Tore T. Gens, Jönköping, Sweden

[73] Assignee: Saab-Scania Aktiebolag, Sodertalje, Sweden

[21] Appl. No.: 119,828

[22] Filed: Feb. 8, 1980

[30] Foreign Application Priority Data

Feb. 19, 1979 [SE] Sweden .................. 7901436

[51] Int. Cl.³ .............. F04B 17/00; F16L 55/00; F16L 21/00
[52] U.S. Cl. .................. 417/360; 137/565; 285/49; 285/237
[58] Field of Search .............. 285/286, 237, 158, 159, 285/49; 417/360; 137/565

[56] References Cited

U.S. PATENT DOCUMENTS

| | | | |
|---|---|---|---|
| 2,785,864 | 3/1957 | Jordan | 285/49 |
| 2,856,207 | 10/1958 | Bunsen et al. | 285/286 |
| 3,026,815 | 3/1962 | Jacobs | 285/49 |
| 3,292,246 | 12/1966 | Nielsen | 285/158 |
| 3,722,757 | 3/1973 | Dahlgren | 417/360 |
| 3,880,362 | 4/1975 | Guth et al. | 285/159 |
| 4,009,895 | 3/1977 | Koskolos | 285/158 |

FOREIGN PATENT DOCUMENTS

| | | |
|---|---|---|
| 1525573 | 5/1969 | Fed. Rep. of Germany . |
| 2654829 | 6/1978 | Fed. Rep. of Germany . |
| 401801 | 5/1978 | Sweden . |
| 1286159 | 8/1972 | United Kingdom . |
| 1435190 | 5/1976 | United Kingdom . |

Primary Examiner—A. Michael Chambers
Attorney, Agent, or Firm—Cushman, Darby & Cushman

[57] ABSTRACT

An arrangement for attaching a tank fitting to a plastics fuel tank for motor vehicles. Through an outwardly directed pipe stub in the tank wall the fitting is inserted and fastened to the tank. Between fitting and pipe stub an elastic sleeve is clamped whose inner end by means of an inner clamping means sealingly engages against the fitting, and whose outer end by means of an outer clamping means surrounds the pipe stub. The inner clamping means is part of a stiffening member bearing against the inside of the pipe stub by means of an upper support ring. The outer end of the sleeve is folded over outwardly and pressed sealingly against the pipe stub by means of the outer clamping means and aganist the reinforcing action of the stiffening member. The arrangement enables a simple and sealed attachment of heavy tank fittings, e.g. a fuel pump.

3 Claims, 1 Drawing Figure

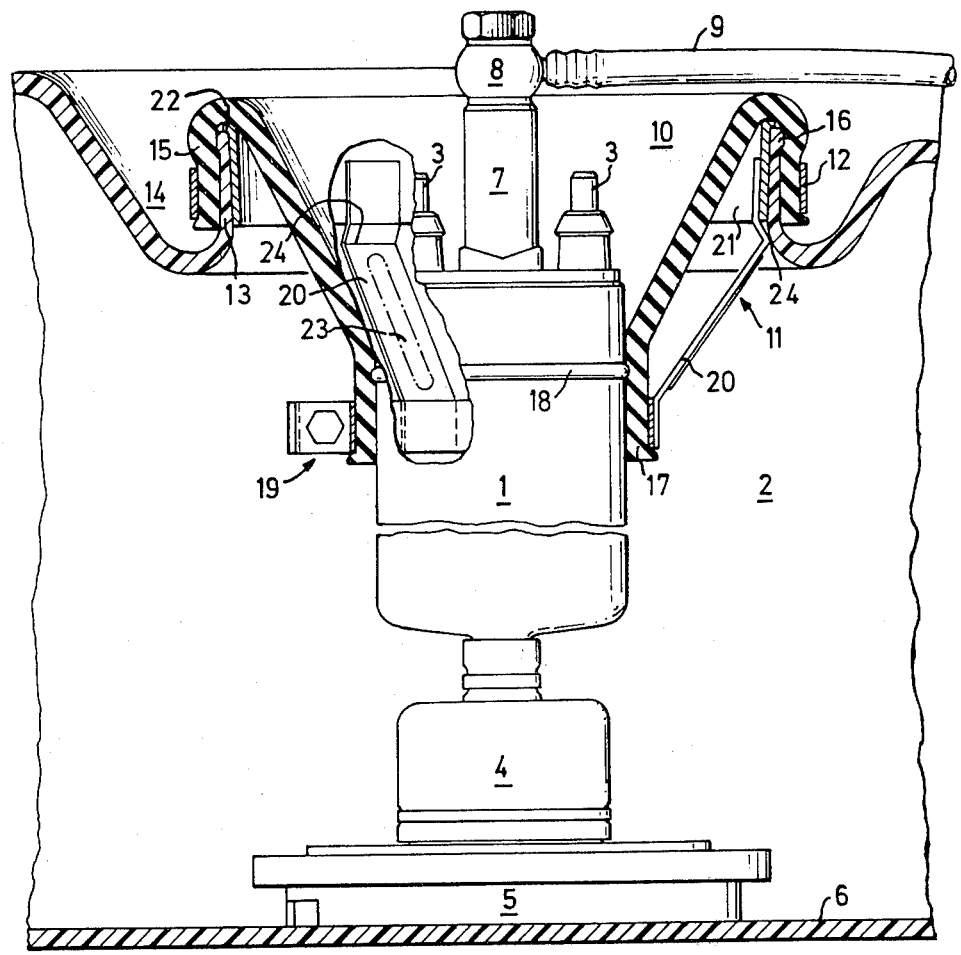

ARRANGEMENT FOR ATTACHING A TANK FITTING TO A FUEL TANK

The present invention relates to an arrangement for attaching a tank fitting to a fuel tank made in plastics for motor vehicles, said tank being provided with an outwardly pointing pipe stub formed in the tank wall and through which pipe stub the fitting is inserted and attached to the fuel tank by means of fastening means.

Such an arrangement is previously known from the Swedish published specification No. 7310166-9, with the publication No. 401 801. The known structure comprises a pipe stub formed on a container, with an outer thread and an inwardly directed flange and a fitting inserted in this pipe stub and fastened thereto by means of a threaded ring. When the ring is screwed onto the pipe stub, an outer outwardly directed flange on the fitting is pressed against an O-ring placed on the upper side of the pipe stub flange, thus providing sealing between the fitting and the pipe stub.

The threaded pipe stub and ring are, however, relatively expensive to manufacture, and the cost increases with increased diameter of the pipe stub. With current manufacturing methods, there is also the difficulty of providing a tight threaded joint for large pipe stub diameters. The presence of a loose O-ring also makes rapid and positive fitting more difficult, and the risk of uneven tightening of the O-ring with resulting leakage cannot be entirely excluded either.

From practical utilization on vehicles, it is also known to mount an electrically driven fuel pump inside a fuel tank made from sheet metal. A sealing rubber sleeve with clips is in this case arranged to connect the pump with a bayonet fitting, which via a sealing O-ring is attached round a hole in the fuel tank.

This solution also includes a loose O-ring, and this makes simple and positive attachment of the tank fitting more difficult. The locking arrangement cannot be applied to fuel tanks made in plastics either, due to the fact that plastics have different properties with respect to strength, stiffness and hardness.

The present invention has the object of eliminating said disadvantages and relates to an arrangement, particularly for attaching heavy tank fittings, e.g. a fuel pump, on a fuel tank made from plastics. The fuel tank is in one wall provided with an outwardly facing relatively large diameters pipe stub through which the fittings are inserted and attached to the fuel tank by means of attachment means. The arrangement enables rapid and secure attachment of the armature, especially with regard to leakage, to the fuel tank and dampens the transmission of sound and shock forces between the armature and the tank, and vice versa.

The invention is distinguished in that at least one connecting means comprises a sleeve of an elastic material, e.g. plastics or rubber, clamped between the fitting and the pipe stub, the inner end of the sleeve surrounding the fitting and kept in place by means of an inner clamping means, while the outer end of the sleeve surrounds the pipe stub and is clamped by means of an outer clamping means.

The invention is further distinguished in that the inner clamping means constitutes an integrated portion of an annular stiffening member comprising a lower compression ring and an upper carrying ring, there being a plurality of supporting fingers between the rings and attached thereto. In the inventive arrangement, the outer end portion of the sleeve is folded outwardly to surround the outer periphery of the pipe stub, and the outwardly folded portion of the sleeve is clamped against the outer cylindrical surface of the pipe stub with the stiffening member assisting in counteracting deformation.

As a result of said attachment, the sleeve is also arranged for coaction with the stiffening member to take up the loads occurring as a result of shaking and vibration during operation of the vehicle as well as possibly prevailing excess pressure in the fuel tank. Together with the stiffening member, the sleeve can be simply preassembled on the fitting. When the fitting is to be installed in a fuel tank, the preassembled unit is inserted in a pipe stub intended for the purpose, and the foldedover end portion of the sleeve is arranged to surround the end of the pipe stub. There is no need here to pay any attention to loose sealing means. Using a conventional pipe clip, the sleeve and thus the preassembled unit is tightened onto the pipe stub.

In an advantageous embodiment of the invention, the stiffening member has radially outer portions, the outer diameter of which slightly exceeds the inner diameter of the pipe stub. Said outer portions cause an elastic expansion of the opening when the stiffening member is inserted in the pipe stub, and assume an axial position under the outer clamping means in a fitted condition. By snap action, the outer portions of the stiffening member are thus caused to assume a position creating further security against an undesired loosening of the attachment of the fitting in the fuel tank.

Other distinguishing features of the invention are apparent from the following description and patent claims.

The description of an advantageous embodiment exemplifying the invention will be given while referring to the attached FIGURE which illustrates in cross section an inventive pump installation in a fuel tank.

A tank fitting in the form of a fuel pump 1 is by means of a plurality of fastening means 10–12 mounted in a fuel tank 2 formed from a thermoplastics. The fuel pump 1 is of a conventional type comprising an electric motor (not shown) fed with current via two terminals 3. The downward suction end of the pump 1 is connected to a suction strainer 5 via a rubber muff 4, the strainer being supported by the bottom 6 of the fuel tank. The pump 1 draws in fuel via the strainer 5 and then forces the fuel through a central pipe 7, an elbow connection 8 and a hose 9 connected thereto, taking it to the engine fuel injection system (not shown).

The fastening means 10–12 for attaching the pump 1 to the fuel tank 2 comprise a sleeve 10, a stiffening member 11 and a clip 12, all of which coact with a pipe stub 13 formed on the fuel tank 2. The pipe stub is formed with an outwardly protruding neck in an outer depression in the fuel tank 2. The depression has the object of limiting the exterior dimensions of the fuel pump installation.

The sleeve 10 covers the peripheral free space between the pump 1 and the pipe stub 13 and extends conically into the opening of the pipe stub 13. The inner end of the sleeve 10 is terminated by an inner cylindrical portion 17 surrounding the pump 1 axially below a bead 18 formed on the pump. Said inner portion 17 on the sleeve 10 is pressed into sealing engagement against the pump 1 by means of an inner clamping means incorporated in the stiffening member 11.

The sleeve 10 is advantageously formed from a fuel-proof rubber material, e.g. epichlorohydrin, and the outer end portion of the sleeve 10 is folded over outwardly to grip with an outer portion the pipe stub 13. Said outer portion 15 of the sleeve 10 is surrounded in turn by the clip 12, which by threaded means (not shown) can be conventionally tightened round the outer cylindrical surface of the pipe stub 13. For achieving safety against unintentional loosening of the clip 12, the latter engages against the outer portion 15 of the sleeve and the pipe stub 13 axially below a bead 16 formed on the outer end of the pipe stub.

The stiffening member 11 is annular and comprises a lower clamping ring 19 and an upper support ring 21, there being a plurality of supporting fingers 20 welded between the rings 19,21, only two of said fingers being shown in the FIGURE. The lower clamping ring 19 is formed as a conventional clip, with which the sleeve 10 can be conventionally clamped around the pump 1. The upper support ring 21 is cylindrical and serves to support the pipe stub 13 when the clip 12 is tightened round the outer portion 15 of the sleeve, whereby a sealed joint can be obtained between the sleeve 10 and the pipe stub 13. Furthermore, the support ring 21 is formed with a slight taper axially and inwardly, its outer end being provided with a radial, outwardly directed flange 22 ensuring the correct position of the stiffening member 11 in relation to the pipe stub 13.

The supporting fingers 20 are each provided with a stiffening elongate depression 23 and a transversely bent knee 24, which, seen in an axial direction, is situated just below the support ring 21. The radially outer portions thus obtained by the supporting finger knees 24 form a circle with a diameter which is somewhat larger than the inside diameter of the pipe stub 13. The result of this is that when the stiffening member 11 is fitted into the fuel tank 2, the knees 24 expand the opening in the pipe stub 13 so that the stiffening member 11 can be thrust into the position illustrated in the FIGURE. If there are axial, outwardly directed loads on the assembled arrangement, e.g. due to excess pressure in the fuel tank 2, the knees 24 prevent the stiffening member 11, and thereby also the pump 1 and sleeve 10 connected thereto, to move outwardly.

The stiffening member is suitably formed in sheet metal, but a fuel-prool hard plastics material can be satisfactory in certain arrangements.

The invention is not limited to the embodiment described, but can be modified into a plurality of embodiments within the scope of the following patent claims.

What I claim is:

1. An arrangement for attaching a tank pump means to a fuel tank for motor vehicles, said fuel tank being made of plastic material and having a pipe stub pointing upwards, away from the interior of the tank, said tank pump means being inserted into the tank through said pipe stub and being attached to the fuel tank by means of an attachment means, wherein said attachment means comprises a resilient sleeve having an inner end and an outer end, the outer end of the sleeve including a portion folded over outwards to surround said pipe stub and being clamped to the outside of the pipe stub by means of an outer clamping means, the inner end of the sleeve surrounding the tank pump means and being clamped to it by means of an inner clamping means, said inner clamping means constituting part of a stiffening member that includes a support means having an outer end portion for supporting the inner cylindrical surface of the pipe stub at the region where the outer end of the sleeve is clamped to the pipe stub and an inner portion connected to said inner clamping means.

2. An arrangement as in claim 1, wherein said inner clamping means includes a clamping ring which surrounds and engages the inner end of said sleeve, said support means further including a cylindrical support ring which is rigidly connected to said clamping ring by said support means, said support means further including at least two support members, and said support ring supporting said inner cylindrical surface of said pipe stub at said region.

3. An arrangement as in claim 2, wherein said support members each have a radially outer portion for snapping into contact with the inside of the tank at the region of the pipe stub when inserting said stiffening member into the pipe stub for securing said stiffening member within the tank.

* * * * *